United States Patent
Lewis et al.

(10) Patent No.: US 6,592,997 B2
(45) Date of Patent: Jul. 15, 2003

(54) CURABLE SILICONE COMPOSITIONS, METHODS AND ARTICLES MADE THEREBY

(75) Inventors: Larry Neil Lewis, Scotia, NY (US); Steven Kenneth Gifford, Buskirk, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/892,529

(22) Filed: Jun. 25, 2001

(65) Prior Publication Data

US 2003/0032752 A1 Feb. 13, 2003

(51) Int. Cl.$^7$ ............................................. B32B 15/08
(52) U.S. Cl. .................. 428/447; 525/474; 525/479; 524/432; 524/433; 524/430; 524/403; 524/404; 524/437; 524/413; 524/588; 528/33; 528/24; 528/27; 528/32; 528/38
(58) Field of Search ................. 524/588, 432, 524/433, 430, 403, 404, 437, 413; 525/474, 479; 428/447; 528/33, 24, 27, 32, 38

(56) References Cited

U.S. PATENT DOCUMENTS

| 4,370,358 | A | * | 1/1983 | Hayes et al. |
| 4,684,538 | A | * | 8/1987 | Klemarczyk |
| 4,963,438 | A | * | 10/1990 | Weitemeyer et al. |
| 5,436,073 | A | * | 7/1995 | Williams et al. |
| 5,981,641 | A | * | 11/1999 | Takahashi et al. |
| 6,020,424 | A | | 2/2000 | Osuna et al. |

OTHER PUBLICATIONS

Freeman, Silicones, Published for the Plastics Institute, 1962, Table 2.2.*
Abstract—Japanese—"Highly Heat–conductive Hot–press Polyimide–siloxane Adhesive Films", Sakamoto J., Takeda, T. Takeda, N.
Abstract—Japanese—"Thermally Conductive Filled Siloxanes"— Toya, M.
"Aluminum Nitride and Diamond Particle Filled Polyimidesiloxane As Dielectrics With Low Thermal Expansion and Increased Thermal Conductivity", Lin Li and D.D. L. Chung—4th International Sample Electronics Conf., Jun. 12–14, 1990.
"Thermophysical Properties of a Thermal Interface Material", Yi He, Intel Corp., Proc. NATAS Annu. Conf. Therm. Anal. Appl.—2000, pp. 495–500.
"Thermal–Mechanical Measurement and Analysis of an Advanced Thermal Interface Material Construction", Farhad Raiszadeh, INCEP Tech. Inc., Seventeeth IEEE SEMI'THERM Symposium, 2001, pp. 63–70.
"Thermal Testing Methods for Evaluating Thin Thermally Conductive Materials", Christine Vogdes and Felix Oseguera, Raychem Interconnect, Sixteenth IEEE SEMI–THERM Symposium 2000, pp. 188–194.
"Thermal Modeling of Grease–Type Interface Material in PPGA Application", Chia–Pin Chiu, Gary L. Solbrekken and Yoke D. Chung, Intel Corp., Thirteenth IEEE SEMI-–THERM Symposium, pp. 57–63, 1997.
"Sodium Silicate Bsed Thermal Interface Material for High Thermal Contact Conductance", Y. Xu, X. Luo, D.D.L. Chung, Transactions of the ASME, vol. 122, Jun. 2000, pp. 128–130.
"Thermal Interface Materials", D.D.L. Chung, Journal of Materials Engineering and Performance, vol. 10(1) Feb. 2001, pp. 56–59.

\* cited by examiner

*Primary Examiner*—Robert Dawson
*Assistant Examiner*—Kuo-Liang Peng
(74) *Attorney, Agent, or Firm*—Bernadette M. Bennett; Noreen C. Johnson

(57) ABSTRACT

A polydiorganosiloxane with a polar radical with a dipole moment greater than 2 debye provides a polydiorganosiloxane with an initial viscosity in a range between about 100 centipoise and about 50,000 centipoise. Further embodiments of the present invention include a silicone composition, a method for substantially increasing the thermal conductivity of a silicone composition, and a thermal interface material containing a silicone composition wherein the silicone composition includes the aforementioned polydiorganosiloxane.

63 Claims, No Drawings

CURABLE SILICONE COMPOSITIONS, METHODS AND ARTICLES MADE THEREBY

BACKGROUND OF THE INVENTION

The present invention is related to silicone compositions. More particularly, the present invention is related to low viscosity, curable polydiorganosiloxane compositions.

Dispensible materials that can cure and give high thermal conductivity are typically used in the electronics industry. Currently, there are two classes of cured articles used as thermally conductive sinks. Sakamoto et al., Japanese Patent No. 05117598, discuss highly filled matrices that are cured to make a pad. The pad can be cut and physically placed in an electronics device. Toya, Japanese Patent No. 02097559, discuss a filled matrix that is dispensed and cured in place. The dispensable approach requires that the material have a viscosity that is low enough such that the material can be forced through an orifice for rapid manufacture of many parts. However, the final cured product must have sufficiently high thermal conductivity.

There remains a need to find a material that has a sufficiently low viscosity such that it can be rapidly placed on a small device with high power requirements. The high power requirement needs a way to remove more heat. This requirement necessitates a thermally conductive material. Thus, dispensable, curable, and high thermally conductive materials are constantly being sought.

BRIEF SUMMARY OF THE INVENTION

The present invention provides a polydiorganosiloxane comprising the general formula:

$$(R^4)_2R^5SiO[(R^4)_2SiO]_m[R^4R^5SiO]_nSi(R^4)_2R^5$$

wherein $R^5$ is a polar radical with a dipole moment great than about 2 debye; $R^4$ comprises $C_{1-8}$ alkyl radicals, phenyl radicals, vinyl radicals or mixtures thereof; and "m"+"n" has a value sufficient to provide a polydiorganosiloxane composition with an initial viscosity in a range between about 100 centipoise and about 50,000 centipoise at 25° C.

The present invention further provides a silicone composition comprising a curable adhesive formulation which comprises (A) a polydiorganosiloxane comprising the general formula:

$$(R^4)_2R^5SiO[(R^4)_2SiO]_m[R^4R^5SiO]_nSi(R^4)_2R^5$$

wherein $R^5$ a polar radical with a dipole moment greater than about 2 debye; $R^4$ comprises $C_{1-8}$ alkyl radicals, phenyl radicals, vinyl radicals or mixtures thereof; and "m"+"n" has a value sufficient to provide a polydiorganosiloxane with an initial viscosity in a range between about 100 centipoise and about 50,000 centipoise at 25° C.;

(B) at least one thermally conductive filler; and
(C) at least one diluant wherein the total silicone composition has a viscosity in a range between about 10,000 centipoise and about 250,000 centipoise at 25° C.

In yet a further embodiment of the present invention, there is provided a method for substantially increasing the thermal conductivity of a silicone composition comprising:

providing at least one polydiorganosiloxane wherein the polydiorganosiloxane has the general formula:

$$(R^4)_2R^5SiO[(R^4)_2SiO]_m[R^4R^5SiO]_nSi(R^4)_2R^5$$

wherein $R^5$ a polar radical with a dipole moment great than about 2 debye; $R^4$ comprises $C_{1-8}$ alkyl radicals, phenyl radicals, vinyl radicals or mixtures thereof; and "m"+"n" has a value sufficient to provide a polydiorganosiloxane with an initial viscosity in a range between about 100 centipoise and about 50,000 centipoise at 25° C.; and combining into the polydiorganosiloxane at least one thermally conductive filler in a range between about 60% by weight and about 95% by weight of the total composition wherein the total silicone composition has a viscosity in a range between about 10,000 centipoise and about 250,000 centipoise at 25° C.

In yet a further embodiment of the present invention, there is provided a thermal interface material comprising:

(A) at least one polydiorganosiloxane comprising $$(R^4)_2R^5SiO[(R^4)_2SiO]_m[R^4R^5SiO]_nSi(R^4)_2R^5$$

wherein $R^5$ a polar radical with a dipole moment greater than about 2 debye; $R^4$ comprises $C_{1-8}$ alkyl radicals, phenyl radicals, vinyl radicals or mixtures thereof; and "m"+"n" has a value sufficient to provide a polydiorganosiloxane with an initial viscosity in a range between about 100 centipoise and about 50,000 centipoise at 25° C.;

(B) at least one thermally conductive filler; and
(C) at least one diluant wherein the thermal interface material provides adhesion to at least one substrate.

DETAILED DESCRIPTION OF THE INVENTION

It has been found that the use of a polydiorganosiloxane with polar-functional groups provides a substantially lower initial viscosity. "Substantially lower initial viscosity" as used herein refers to a polydiorganosiloxane with a viscosity in a range between about 100 centipoise (cps) and 50,000 centipoise at 25° C. When the polydiorganosiloxane of the present invention is combined with a diluant, at least one thermally conductive filler, and optionally, a cure catalyst, a total silicone composition is formed with a substantially higher thermal conductivity.

"Substantially higher thermal conductivity" as used herein refers to a composition with a thermal conductivity greater than about 1.5 Watts per meter per degree Kelvin (W/mK). The "viscosity of the total silicone composition" as used herein typically refers to a viscosity before cure of the composition in a range between about 10,000 centipoise and 250,000 centipoise and preferably, in a range between about 20,000 centipoise and about 100,000 centipoise at 25° C.

The polar-containing polydiorganosiloxane has the general formula (I), $$(R^4)_2R^5SiO[(R^4)_2SiO]_m[R^4R^5SiO]_nSi(R^4)_2R^5 \quad (I)$$

wherein $R^5$ is a polar radical with a dipole moment greater than about 2 debye; $R^4$ comprises $C_{1-8}$ alkyl radicals, phenyl radicals, vinyl radicals, or mixtures thereof; and "m"+"n" has a value sufficient to provide an initial viscosity in a range between about 100 centipoise and about 50,000 centipoise at 25° C. and a polar content in a range between about 1% by weight and about 10% by weight of the polar-containing polydiorganosiloxane. Radicals represented by $R^4$ are preferably $C_{1-4}$ alkyl radicals and more preferably, methyl. Typically, the polar-containing polydiorganosiloxane is present in a range between about 0.5% by weight and about 5% by weight of the total composition, and more typically in a range between about 1% by weight and about 2% by weight of the total composition.

The polar radical is typically a cyano functional group, an epoxy functional group such as cyclohexyloxy and 7-oxabicyclo[4,1,0]hept-3-yl, and glycidoxy, an acryloxy functional group, a methacryloxy functional group, a urethane group or combinations thereof. Most typically, the polar radical is an acryloxy, methacryloxy, or epoxy functional group.

Additionally, a reactive organic diluent may be added to the silicone composition to decrease the viscosity of the composition. Examples of diluants include, but are not limited to, styrene monomers such as tert-butyl styrene (t-Bu-styrene), (meth)acrylate monomers such as methylmethacrylate and hexanedioldiacrylate, methacryloxy-containing monomers such as methacryloxypropyltrimethoxysilane, epoxy-containing monomers such as biscyclohexaneoxypropyldimethylsiloxane, and glycioxy-containing monomers such as glycidoxypropyltrimethoxysilane. It is to be understood that (meth)acrylate includes both acrylates and methacrylates. The mixture of the diluant and the polar-containing polydiorganosiloxane lowers the viscosity, which allows for higher loading of filler. The amount of filler in the silicone composition is directly proportional to the thermal conductivity. Thus, the higher the amount of filler in the silicone composition, the greater the thermal conductivity of the silicone composition.

The thermally conductive fillers in the present invention include all common thermally conductive solids. Examples of thermally conductive filler include, but are not limited to, aluminum oxide, aluminum nitride, boron nitride, diamond, magnesium oxide, zinc oxide, zirconium oxide, silver, gold, copper, and combinations thereof. Typically, the thermally conductive filler is aluminum oxide, aluminum nitride, boron nitride, or diamond. The filler is present in a range between about 60% by weight and about 95% by weight of the total composition, more typically the filler is present is in a range between about 75% by weight and about 85% by weight of the total composition.

Cure catalysts may also be present in the total silicone composition that accelerates curing, of the total silicone composition. Typically, the catalyst is present in a range between about 10 parts per million (ppm) and about 2% by weight of the total composition. Examples of cure catalysts include, but are not limited to, peroxide, iodonium salts, and platinum catalysts. Curing typically occurs at a temperature in a range between about 50° C. and about 175° C., more typically in a range between about 100° C. and about 150° C., at a pressure in a range between about 1 atmosphere (atm) and about 5 tons pressure, more typically in a range between about 1 atmosphere and about 100 pounds per square inch (psi). In addition, curing may typically occur over a period in a range between about 5 minutes and about 1 hour, and more typically in a range between about 15 minutes and about 45 minutes.

The composition of the present invention may by hand mixed but also can be mixed by standard mixing equipment such as dough mixers, chain can mixers, planetary mixers, and the like.

The reaction of the present invention can be performed in batch, continuous, or semi-continuous mode. With a batch mode reaction, for instance, all of the reactant components are combined and reacted until most of the reactants are consumed. In order to proceed, the reaction has to be stopped and additional reactant added. With continuous conditions, the reaction does not have to be stopped in order to add more reactants.

Thermally conductive materials as described in the present invention are dispensable and have utility in devices in electronics such as computers or in any device that generates heat and where the device requires the heat to be efficiently removed. The thermally conductive material is typically used as a thermal interface material that provides adhesion to at least one substrate such as silicon, gallium arsenide (GaAs), copper, nickel, and the like.

In order that those skilled in the art will be better able to practice the invention, the following examples are given by way of illustration and not by way of limitation.

EXAMPLE 1

A commercial grade of addition curable polydimethylsiloxane, ECC 4865 was used as a control matrix material. Aluminum oxide obtained from Showa Denko (AS 40) was mixed with ECC 4865 to give 80% by weight aluminum oxide ($Al_2O_3$) of the total composition. Three replicate formulations were prepared and 2 inch×⅛ inch discs were prepared by curing in a Carver press at 150° C., 5000 pounds pressure for 30 minutes. Thermal conductivity was determined using a Holometrix TCA instrument at 100° C. Viscosity was determined using a Brookfield cone and plate viscometer. The thermal conductivity was 0.99 W/mK, standard deviation=0.02. The viscosity of the uncured total composition was in a range between 1000 and 2000 centipoise (cps).

EXAMPLE 2

The formulation of Example 2 was prepared with the same aluminum oxide as Example 1 except that an acryloxy-stopped polydimethylsiloxane polymer (DMS U22 obtained from Gelest) was used in place of ECC 4865. The DMS U22 had 2% by weight peroxide cure catalyst tert-butyl peroxy benzoate, Luperox P® (obtained from Elf Atochem). Cured 2 inch diameter discs were prepared as described in Example 1. The thermal conductivity was 1.17 W/mK which was statistically significantly higher than that obtained in Example 1. The viscosity of the uncured total composition was 11,000 cps.

EXAMPLE 3

In order obtain a lower initial viscosity, the formulation of Example 2 was repeated except that the DMS U22 was replaced with a mixture contained 50/50 (w/w) DMS U22 and t-butyl-styrene. The viscosity of the uncured total composition was now lowered to less than 1000 cps. The thermal conductivity was 94 W/mK.

EXAMPLE 4–6

Several additional formulations were made using higher weight loadings of alumina ($Al_2O_3$) and either the ECC 4865 or DMS U22, with or without t-butyl-styrene diluant. Thermal conductivity and viscosity results can be Table 1.

TABLE 1

| Example | Matrix | % Al$_2$O$_3$ | Viscosity (cps) | Thermal Conductivity (W/mK) |
|---|---|---|---|---|
| 1 | ECC 4865 | 80 | 1000–2000 | 1.0 |
| 2 | DMS U22 | 80 | 11,000 | 1.17 |
| 3 | ECC 4865 | 83 | 30,000 | 1.18 |
| 4 | DMS U22 | 83 | Not Available | 1.45 |
| 5 | ECC 4865 | 87 | Not Available | 1.46 |
| 6 | DMS U22/ Bu-styrene | 87 | 111,000 | 1.59 |

EXAMPLE 7

The formulation from Example 1 was repeated except that aluminum nitride, 500-50 WRS-2 obtained from ART, 79% by weight, was used in place of aluminum oxide. The viscosity of the uncured total composition was 137,000 cps. The thermal conductivity of the cured part was 0.98 W/mK.

EXAMPLE 8

The formulation from Example 7 was repeated except that a 50/50 (w/w) mixture of acryloxy on chain acryloxysiloxane dimethylsiloxane copolymer, UMS182 (Gelest) and t-butyl-styrene was used in place of ECC 4865. The viscosity of the uncured total composition was 148,000 cps but a higher thermal conductivity, 1.35 W/mK, was obtained versus the sample from Example 7.

EXAMPLE 9

The formulation from Example 7 was repeated except that aluminum nitride, WRSX2A100 was used at 77% by weight of the total composition. Higher levels of this aluminum oxide in the ECC 4865 gave a material that was too stiff to measure. The viscosity of the uncured total composition was 262,000 cps and the thermal conductivity of the cured part was 1.17 W/mK.

EXAMPLE 10

The formulation from Example 8 was repeated using the aluminum nitride from Example 9. The viscosity of the uncured total composition was 136,000 cps. 81.5% aluminum oxide was added to this formulation. Note more aluminum oxide was added and a lower viscosity was obtained versus the formulation of Example 9. The thermal conductivity was 1.62 W/mK.

EXAMPLE 11

The aluminum nitride powders used in Examples 7–10 contained proprietary (to ART) coatings that prevent release of ammonia during cure. When an un-coated aluminum nitride, A100 (ART) was combined with ECC 4865 at 81.5%, the viscosity of the uncured total composition was 105,000 cps but it was not possible to cure this formulation. Although not bound by theory, presumably the ammonia released from this aluminum nitride inhibited the platinum cure catalyst.

EXAMPLE 12

A formulation was prepared with 81.5% ART A100 aluminum nitride and 50/50 (w/w) DMS U22 and t-butyl styrene. The viscosity of the uncured total composition was 36,200 cps and the thermal conductivity was 1.54 W/mK.

EXAMPLE 13–16

Additional formulations were made with the acryloxysiloxanes and/or the styrene diluant using different aluminum nitride (Al$_3$N$_4$) powders. Thermal conductivity and viscosity results of the uncured total composition can be seen in Table 2.

TABLE 2

| Example | % Al3N4 | Source Al$_3$N$_4$ | matrix | Viscosity (cps) | Therm Cond (W/mK) |
|---|---|---|---|---|---|
| 7 | 79 | 500–50 WRS-2 (ART) | ECC 4865 | 137,000 | 0.98 |
| 8 | 79 | 500–50 WRS-2 (ART) | UMS182/ Bu-styrene | 148,000 | 1.35 |
| 9 | 77 | WRSX2-A100 (ART) | ECC 4865 | 262,000 | 1.17 |
| 9a | 80 | WRSX2-A100 (ART) | ECC 4865 | Dry powder | — |
| 10 | 81.5 | WRSX2-A100 (ART) | UMS182/ t-Bu-styrene | 136,000 | 1.62 |
| 11 | 81.5 | A100 (ART) | ECC 4865 | 105,000 | No cure |
| 12 | 81.5 | A100 (ART) | DMS U22/ t-Bu-styrene | 36,200 | 1.54 |
| 13 | 80 | 500–50 (Accumet) | ECC 4865 | Stiff | 1.48 |
| 14 | 78.9 | 500–50 (Accumet) | DMS U22/ t-Bu-styrene | 12,600 | 1.8 |
| 15 | 80.3 | 500–50 (Accumet) | UMS182/ t-Bu-styrene | 159,000 | 1.79 |
| 16 | 85.7 | A100 (ART) | UMS182/ t-Bu-styrene | 132,000 | 2.18 |

While embodiments have been shown and described, various modifications and substitutions may be made thereto without departing from the spirit and the scope of the invention. Accordingly, it is to be understood that the present invention has been described by way of illustration and not limitation.

What is claimed is:

1. A silicone composition comprising a curable adhesive formulation which comprises (A) a polydiorganosiloxane comprising the general formula:

$(R^4)_2R^5SiO[(R^4)_2SiO]_m[R^4R^5SiO]_nSi(R^4)_2R^5$ wherein $R^5$ a polar radical with a dipole moment greater than about 2 debye; $R^4$ comprises $C_{1-8}$ alkyl radicals, phenyl radicals, vinyl radicals or mixtures thereof; and "m"+"n" has a value sufficient to provide a polydiorganosiloxane with an initial viscosity in a range between about 100 centipoise and about 50,000 centipoise at 25° C.;

(B) at least one thermally conductive filler; and (C) at least one diluant wherein the total silicone composition has a viscosity in a range between about 10,000 centipoise and about 250,000 centipoise at 25° C.

2. The silicone composition in accordance with claim 1, wherein the polar radical comprises a cyano group, an epoxy group, an acryloxy group, a methyacryloxy group, a urethane group, or combinations thereof.

3. The silicone composition in accordance with claim 2, wherein the polar radical comprises an acryloxy group.

4. The silicone composition in accordance with claim 2, wherein the polar radical comprises an epoxy group.

5. The silicone composition in accordance with claim 4, wherein the polar radical comprises 7-oxabicyclo[4,1,0]hept-3-yl.

6. The silicone composition in accordance with claim 1, wherein $R^4$ is a methyl group.

7. The silicone composition in accordance with claim 1, wherein the at least one thermally conductive filler comprises aluminum oxide, aluminum nitride, boron nitride, diamond, magnesium oxide, zinc oxide, zirconium oxide, silver, gold, copper, or combinations thereof.

8. The silicone composition in accordance with claim 7, wherein the at least one thermally conductive filler comprises aluminum oxide.

9. The silicone composition in accordance with claim 7, wherein the at least one thermally conductive filler comprises diamond.

10. The silicone composition in accordance with claim 7, wherein the at least one thermally conductive filler comprises aluminum nitride.

11. The silicone composition in accordance with claim 7, wherein the at least one thermally conductive filler comprises boron nitide.

12. The silicone composition in accordance with claim 1, wherein the at least one filler is present in a range between about 60% by weight and about 95% by weight of the total composition.

13. The silicone composition in accordance with claim 1, wherein the diluant comprises tert-butyl-styrene, methacryloxypropyltrimethoxysilane, methylmethacrylate, hexanedioldiacrylate, or glycidoxypropyltrimethoxysilane.

14. The silicone composition in accordance with claim 13, wherein the diluant comprises tert-butyl-styrene.

15. The silicone composition in accordance with claim 1, wherein the diluant is present in a range between about 1% by weight and about 20% by weight of the total composition.

16. The silicone composition in accordance with claim 1, wherein the composition provides a thermal conductivity greater than about 1.5 W/mK.

17. The silicone composition in accordance with claim 1, wherein the composition provides adhesion to at least one substrate.

18. The silicone composition in accordance with claim 17, wherein the substrate comprises silicon.

19. The silicone composition in accordance with claim 1, which further comprises a curing catalyst.

20. The silicone composition in accordance with claim 19, wherein the curing catalyst comprises peroxide, iodonium salt, or platinum catalyst.

21. The silicone composition in accordance with claim 19, wherein the catalyst is present in a range between about 10 parts per million and about 2% by weight of the total composition.

22. A silicone composition comprising a curable adhesive formulation which comprises (A) a polydiorganosiloxane comprising the general formula:

wherein $R^5$ is an acryloxy group or an epoxy group; $R^4$ is methyl, "m"+"n" has a value sufficient to provide a polydiorganosiloxane with an initial viscosity in a range between about 100 centipoise and about 50,000 centipoise at 25° C.;

(B) at least one thermally conductive filler comprising aluminum oxide, aluminum nitride, boron nitride, or diamond;

(C) at least one diluant comprising tert-butyl-styrene; and (D) at least one curing catalyst comprising peroxide, iodonium salt, or platinum catalyst wherein the total silicone composition has a viscosity in a range between about 10,000 centipoise and about 250,000 centipoise at 25° C.

23. A method for substantially increasing the thermal conductivity of a silicone composition comprising:

providing at least one polydiorganosiloxane wherein the polydiorganosiloxane has the general formula:

wherein $R^5$ a polar radical with a dipole moment greater than about 2 debye; $R^4$ comprises $C_{1-8}$ alkyl radicals, phenyl radicals, vinyl radicals or mixtures thereof; and "m"+"n" has a value sufficient to provide a polydiorganosiloxane with an initial viscosity in a range between about 100 centipoise and about 50,000 centipoise at 25° C.; and combining into the polydiorganosiloxane at least one thermally conductive filler in a range between about 60% by weight and about 95% by weight of the total composition wherein the total silicone composition has a viscosity in a range between about 10,000 centipoise and about 250,000 centipoise at 25° C.

24. The method in accordance with claim 23, wherein the polar radical comprises an epoxy group, a cyano group, an acryloxy group, a methacryloxy group, a urethane group, or combinations thereof.

25. The method in accordance with claim 24, wherein the polar radical comprises an acryloxy group.

26. The method in accordance with claim 24, wherein the polar radical comprises an epoxy group.

27. The method in accordance with claim 26, wherein the polar radical comprises 7-oxabicyclo[4,1,0]hept-3-yl.

28. The method in accordance with claim 23, wherein $R^4$ is methyl.

29. The method in accordance with claim 23, wherein the at least one thermally conductive filler comprises aluminum oxide, aluminum nitride, boron nitride, diamond, magnesium oxide, zinc oxide, zirconium oxide, silver, gold, copper, or combinations thereof.

30. The method in accordance with claim 29, wherein the at least one thermally conductive filler comprises aluminum oxide.

31. The method in accordance with claim 29, wherein the at least one thermally conductive filler comprises diamond.

32. The method in accordance with claim 29, wherein the at least one thermally conductive filler comprises aluminum nitride.

33. The method in accordance with claim 29, wherein the at least one thermally conductive filler comprises boron nitride.

34. The method in accordance with claim 23, further comprising combining into the polydiorganosiloxane composition a diluant.

35. The method in accordance with claim 34, wherein the diluant comprises tert-butyl-styrene, methacryloxypropyltrimethoxysilane, methylmethacrylate, hexanedioldiacrylate, or glycidoxypropyltrimethoxysilane.

36. The method in accordance with claim 35, wherein the diluant comprises tert-butyl styrene.

37. The method in accordance with claim 34, wherein the diluant is present in a range between about 1% by weight and about 20% by weight of the total composition.

38. The method in accordance with claim 23, wherein the composition provides a thermal conductivity greater than about 1.5 W/mK.

39. The method in accordance with claim 23, further comprising combining into the polydiorganosiloxane composition a curing catalyst.

40. The method in accordance with claim 39, wherein the curing catalyst comprises peroxide, iodonium salt, or platinum catalyst.

41. The method in accordance with claim 39, wherein the catalyst is present in a range between about 10 parts per million and about 2% by weight of the total composition.

42. A method for substantially increasing the thermal conductivity of a silicone composition comprising:

providing at least one polydiorganosiloxane wherein the polydiorganosiloxane has the general formula:

wherein $R^5$ comprises an acryloxy group or epoxy group; $R^4$ is methyl, "m"+"n" has a value sufficient to provide a polydiorganosiloxane with an initial viscosity in a range between about 100 centipoise and about 50,000 centipoise at 25° C.;

combining into the polydiorganosiloxane at least one thermally conductive filler in a range between about 60% by weight and about 95% by weight of the total composition wherein the filler comprises aluminum oxide, aluminum nitride, boron nitride, or diamond;

combining into the polydiorganosiloxane at least one diluant wherein the diluant comprises tert-butyl styrene; and combining into the polydiorganosiloxane at least one cure catalyst wherein the cure catalyst comprises peroxide, iodonium salt, or platinum catalyst wherein the total composition provides a thermal conductivity greater than about 1.5 W/mK and a viscosity in a range between about 10,000 centipoise and about 250,000 centipoise at 25° C.

43. A thermal interface material comprising:

(A) at least one polydiorganosiloxane comprising

wherein $R^5$ a polar radical with a dipole moment greater than about 2 debye; $R^4$ comprises $C_{1-8}$ alkyl radicals, phenyl radicals, vinyl radicals or mixtures thereof; and "m"+"n" has a value sufficient to provide a polydiorganosiloxane with an initial viscosity in a range between about 100 centipoise and about 50,000 centipoise at 25° C.;

(B) at least one thermally conductive filler; and (C) at least one diluant wherein the thermal interface material provides adhesion to at least one substrate.

44. The thermal interface material in accordance with claim 43, wherein the polar radical comprises a cyano group, an epoxy group, an acryloxy group, a methacryloxy group, a urethane group, or combinations thereof.

45. The thermal interface material in accordance with claim 44, wherein the polar radical comprises an acryloxy group.

46. The thermal interface material in accordance with claim 44, wherein the polar radical comprises an epoxy group.

47. The thermal interface material in accordance with claim 46, wherein the polar radical comprises 7-oxabicyclo[4,1,0]hept-3-yl.

48. The thermal interface material in accordance with claim 43, wherein $R^4$ is a methyl group.

49. The thermal interface material in accordance with claim 43, wherein the at least one thermally conductive filler comprises aluminum oxide, aluminum nitride, boron nitride, diamond, magnesium oxide, zinc oxide, zirconium oxide, silver, gold, copper, or combinations thereof.

50. The thermal interface material in accordance with claim 49, wherein the at least one thermally conductive filler comprises aluminum oxide.

51. The thermal interface material in accordance with claim 49, wherein the at least one thermally conductive filler comprises diamond.

52. The thermal interface material in accordance with claim 49, wherein the at least one thermally conductive filler comprises aluminum nitride.

53. The thermal interface material in accordance with claim 49, wherein the at least one thermally conductive filler comprises boron nitride.

54. The thermal interface material in accordance with claim 43, wherein the at least one filler is present in a range between about 70% by weight and about 95% by weight of the total composition.

55. The thermal interface material in accordance with claim 43, wherein the diluant comprises tert-butyl-styrene, methacryloxypropyltrimethoxysilane, methylmethacrylate, hexanedioldiacrylate, or glycidoxypropyltrimethoxysilane.

56. The thermal interface material in accordance with claim 43, wherein the diluant comprises tert-butyl-styrene.

57. The thermal interface material in accordance with claim 43, wherein the diluant is present in a range between about 1% by weight and about 20% by weight of the total composition.

58. The thermal interface material in accordance with claim 43, wherein the composition provides a thermal conductivity greater than about 1.5 W/mK.

59. The thermal interface material in accordance with claim 43, wherein the substrate comprises silicon.

60. The thermal interface material in accordance with claim 43, wherein the composition further comprises a cure catalyst.

61. The thermal interface material in accordance with claim 60, wherein the cure catalyst comprises a peroxide, an iodonium salt, or a platinum catalyst.

62. The thermal interface material in accordance with claim 60, wherein the catalyst is present in a range between about 10 parts per million and about 2% by weight of the total composition.

63. A thermal interface material comprising:

(A) at least one polydiorganosiloxane comprising

wherein $R^5$ a polar radical with a dipole moment greater than about 2 debye; $R^4$ comprises $C_{1-8}$ alkyl radicals, phenyl radicals, vinyl radicals or mixtures thereof; and "m"+"n" has a value sufficient to provide a polydiorganosiloxane composition with an initial viscosity in a range between about 100 centipoise and about 50,000 centipoise at 25° C.;

(B) at least one thermally conductive filler comprising aluminum oxide, diamond, boron nitride, or aluminum nitride;

(C) at least one diluant comprises tert-butyl styrene; and (D) at least one cure catalyst wherein the cure catalyst comprises peroxide, iodonium salt, or platinum catalyst wherein the thermal interface material provides a thermal conductivity greater than about 1.5 W/mK.

* * * * *